United States Patent [19]

Lambregts et al.

[11] Patent Number: 5,079,711

[45] Date of Patent: Jan. 7, 1992

[54] AIRCRAFT HIGH ALTITUDE VERTICAL FLIGHT PATH AND SPEED CONTROL SYSTEM

[75] Inventors: Antonius A. Lambregts, Issaquah; Monte R. Evans, Federal Way, both of Wash.

[73] Assignee: The Boeing Company, Seattle, Wash.

[21] Appl. No.: 485,438

[22] Filed: Feb. 26, 1990

[51] Int. Cl.$^5$ ............................................. B64C 13/00
[52] U.S. Cl. ..................................... 364/434; 364/433; 364/440; 244/181; 244/182
[58] Field of Search .................... 364/433, 434, 440; 244/180, 181, 182

[56] References Cited

U.S. PATENT DOCUMENTS

| | | | |
|---|---|---|---|
| 3,840,200 | 10/1974 | Lambregts | 244/182 |
| 3,892,374 | 7/1975 | Lambregts | 244/182 |
| 3,981,442 | 9/1976 | Smith | 244/182 |
| 3,989,208 | 11/1976 | Lambregts | 244/182 |
| 4,471,439 | 9/1984 | Robbins et al. | 364/433 |
| 4,536,843 | 8/1985 | Lambregts | 364/434 |
| 4,569,021 | 2/1986 | Larson et al. | 364/433 |
| 4,764,872 | 8/1988 | Miller | 364/433 |
| 4,912,642 | 3/1990 | Larsen et al. | 244/182 |

Primary Examiner—Gary Chin
Attorney, Agent, or Firm—Joan H. Pauly

[57] ABSTRACT

A variable bandwidth factor KALT is applied in a total energy control system to obtain a reduction in throttle activity while maintaining system stability. The system has a total energy control loop and an energy distribution control loop. In the former, a net thrust command signal $T_c$ is generated to reduce the total energy error to zero. In the latter, an elevator position command signal $\delta e_c$ is generated to reduce the energy rate distribution error, i.e. correct the distribution of energy between kinetic energy (speed) and potential energy (altitude). The error signal input into each loop has a flight path component and a speed component. The factor KALT is applied to both components of the total energy error to reduce the bandwidth of the total energy control loop with increasing altitude and thereby reduce throttle activity. The factor KALT is also applied to one of the components of the energy distribution error to prioritize reduction of that component to zero by control of elevator position. Preferably, speed control is prioritized, and energy errors are channeled into short term deviations in altitude.

16 Claims, 10 Drawing Sheets

AIRCRAFT HIGH ALTITUDE VERTICAL FLIGHT PATH AND SPEED CONTROL SYSTEM

The Government has rights in this invention.

TECHNICAL FIELD

This invention relates to systems for controlling aircraft vertical flight path and speed and for reducing throttle activity. It more particularly relates to such a system in which net thrust and elevator position command signals are generated to reduce a total energy rate error and an energy rate distribution error to zero, and a gain programming factor is applied to reduce throttle activity and prioritize speed control or flight path control.

BACKGROUND OF THE INVENTION

In recent decades, there has been a growing interest in operating aircraft at maximum efficiency. Efficient operation generally requires flying at or near the minimum drag speed and at high altitude. For these flight conditions, conventional vertical flight path and speed control techniques present significant problems For example, the aircraft's vertical flight path is difficult to stabilize using the conventional technique of maintaining constant thrust and adjusting elevator position. The difficulty in stabilizing vertical flight path stems from the fact that, at minimum drag speed and high altitude, lift increase due to pitch rotation is less long term then lift loss to speed loss. This causes speed divergence and ultimately flight path divergence.

Efforts to solve the problem of maintaining flight path and speed stability have been mainly directed toward the development of independent autothrottle systems to control airspeed. The approach of using an autothrottle system independent of flight path control has proved to be less than satisfactory, particularly with regard to throttle activity. At high altitudes, rapid speed control with an autothrottle requires unacceptably large throttle excursions. The large excursions are required because the thrust increment obtained for a given throttle displacement decreases with altitude and, at high altitudes, is only a small faction of that obtained at low altitude. In unsteady air mass conditions, the problem of large throttle excursions is especially great because of the high frequency of speed deviations caused by the unsteady conditions.

A number of refinements of the approach of an independent autothrottle have been developed in an effort to reduce throttle activity and thereby obtain increased fuel efficiency. A throttle control system in which the turbulence induced components of airspeed error and inertial longitudinal acceleration signals are cancelled to reduce throttle activity in turbulence is disclosed in U.S. Pat. No. 3,840,200, granted Oct. 8, 1974, to A.A. Lambregts, a co-inventor of the present application; and U.S. Pat. No. 3,892,374, which issued to the same inventor on July 1, 1975. A further refinement of autothrottle control by the same inventor is the subject of U.S. Pat. No. 3,989,208, granted Nov. 2, 1976. The invention disclosed in that patent is based on the principle of conservation of the total energy of the aircraft and the inherent transfer of energy from altitude to speed and vice versa. The approach of the invention was to correlate speed errors to altitude errors and to allow the speed errors to be compensated by the altitude control. This in principle reduces throttle control demand but in practical application was not fully satisfactory. Within the context of an independent autothrottle system, the approach had significant limitations. The amplitude of the compensation signal had to be limited, and it was difficult to reference the compensation signal in a system that was independent from the autopilot. In addition, the energy compensation approach cannot make up for the variation in the aircraft total energy due to unsteadiness in the atmosphere.

With the development of the invention disclosed in the last-cited patent, the inventor thereof perceived that the conventional approach of independent autothrottle speed control and autopilot flight path control had reached the point of diminishing returns This realization led to the development of the integrated speed control and flight path control system disclosed in U.S. Pat. No. 4,536,843 granted Aug. 20, 1985, to A.A. Lambregts. In the integrated system, cross-over inputs from flight path to the thrust control and from speed to the elevator control are employed to obtain simultaneous speed and flight path control based on kinetic and potential energy principles. The system generates a total energy rate error signal and an energy rate distribution error signal, each of which has a flight path component and a speed component. The aircraft thrust control is operated to control the total energy state and reduce the total energy rate error to zero. The elevator control is simultaneously operated to control the distribution of energy between potential energy (altitude) and kinetic energy (airspeed) and reduce the energy rate distribution error to zero. This integrated approach has proved to be very successful in avoiding many of the deficiencies and limitations of the conventional approach of independent autothrottle and autopilot control systems and in achieving significant gains in performance. The performance gains include excellent speed and flight path control, elimination of undesired throttle activity, and enhanced fuel efficiency. As disclosed in the patent, the system reduces speed and flight path errors to zero at the same rate (with the same response dynamics) and specifically avoids coupling flight path control and speed control. In other words, adjustments to correct speed errors do not create errors in flight path and vice versa.

DISCLOSURE OF THE INVENTION

Following the development of the total energy control system disclosed in U.S Pat. No. 4,536,843, the applicants perceived that the system could be adapted to provide even lower throttle control activity while maintaining tight speed control or, in an alternative embodiment of the invention, tight altitude control. The basic approach of the present invention is to achieve this result by lowering the bandwidth of the total energy control loop and prioritizing the energy distribution control loop to control speed (or altitude in the alternative embodiment). What is meant by "lowering the bandwidth" is that the natural frequency with which the throttles respond to total energy errors is lowered relative to the natural frequency with which the elevator responds to energy distribution errors. Hence, the responsiveness of the throttles to the total energy errors induced by external disturbances characteristic of, for example, turbulence will also be reduced. The total energy control loop continues to respond to altitude and speed commands but at a reduced rate. In the presently preferred embodiment of the invention in which the energy rate distribution control is prioritized to maintain tight speed control, the total energy errors caused by slowing of the total energy control loop are channeled into short term deviations in altitude.

The invention is a system of controlling vertical flight path and speed of an aircraft and of reducing engine throttle activity. The system includes both a method and apparatus for carrying out the method.

In its basic form, the method comprises predetermining the value of a variable bandwidth factor for each of a plurality of flight conditions. A total energy control loop and an energy distribution control loop are provided. During flight, a total energy rate error and an energy rate distribution error are determined. Each of these errors has a flight path component and a speed component. An incremental net thrust command signal is generated, in the total energy control loop, as a function of the total energy rate error, to reduce the total energy rate error to zero. An incremental elevator position command signal is also generated, in the energy distribution control loop, as a function of the energy rate distribution error, to reduce the energy rate distribution error to zero. The bandwidth factor is applied to the net thrust command signal to lower the bandwidth of the total energy control loop, and thereby reduce throttle activity in certain predetermined flight conditions. Simultaneously, the bandwidth factor is applied to one of the components of the energy rate distribution error, to prioritize the energy distribution control loop to reduce the other component of the energy rate distribution error to zero. Preferably, the bandwidth factor is predetermined as a function of altitude. Also preferably, the bandwidth factor is applied to the flight path component of the energy rate distribution error to maintain speed control and channel energy errors into short term deviations in altitude.

Application of the bandwidth factor to the net thrust command signal can make the system unstable. Therefore, the method of the invention preferably includes steps for preserving the stability. In the preferred embodiment of the method, the step of determining the total energy rate error and the energy rate distribution error comprises receiving a command speed signal and an actual speed signal. The actual speed signal is subtracted from the command speed signal to obtain a speed error signal. The bandwidth factor is applied to the speed error signal to preserve system stability. When the system is in an altitude control mode in which an actual altitude signal is subtracted from a command altitude signal to obtain an altitude error signal, the bandwidth factor is preferably also applied to the altitude error signal. The incorporation of these features into a system designed in accordance with the invention provides a simple means for preserving the stability of the system while effectively and reliably attaining the desired results of reduced throttle activity and prioritized elevator position control.

By modifying the type of system disclosed in U.S. Pat. No. 4,536,843, the invention achieves significant reduction in throttle control activity and improvement in fuel efficiency of an aircraft. The decreased throttle control activity is attained by selectively lowering the total energy control bandwidth. The selective lowering of the bandwidth is accomplished by applying the predetermined variable bandwidth factor. The bandwidth factor may be chosen to vary so that throttle control activity decreases when flight conditions are of a type that will readily accommodate deviations caused by the channeling of energy errors. For example, for high altitude flight conditions, short term deviations in altitude can readily be tolerated since the bandwidth factor can be chosen to restrict such deviations to relatively low values that will maintain the aircraft well within the altitude limits of its flight path corridor. The major achievement of the invention is a significant reduction in control activity and improvement in fuel efficiency in high altitude flying conditions, particularly unsteady airmass conditions, such as turbulence and wind shear.

The system of the invention makes possible the achievement of decreased control activity while, at the same time, maintaining the stability of the control system and allowing the baseline rapid response of the speed control to be maintained. In situations in which tighter control may be required, such as in landing or flight within a terminal area, the value of the bandwidth factor may be chosen to eliminate or severely limit its effect on the tight baseline control of both flight path and speed. In the preferred embodiment, this goal is accomplished by the simple technique of making the bandwidth factor a function of altitude. Thus, the use of a variable bandwidth factor readily accommodates the need to maintain the capability for precision maneuvering in a terminal area that is inherently provided by the previously patented integrated total energy control system.

By varying the bandwidth factor to neutralize or minimize its effect at low altitudes, the decoupling of speed control and flight path control characteristic of the baseline integrated system is maintained at low altitudes, i.e. speed control does not induce flight path deviation, and flight path control does not induce speed deviation. A basic concept of the invention is to substantially maintain this decoupling in situations in which speed and/or flight path deviations are not desired and to allow some control coupling when deviations are permissible, such as at high altitude cruising conditions. The invention varies the dynamics of the integrated control system in order to achieve this variation in control coupling. The variation in control dynamics is achieved in a simple manner to thereby maintain the significant advantages of the baseline integrated system. These advantages include simplicity of overall design, relatively low software requirements, efficient implementation of control, and minimal required adaptation for various types of aircraft. Like the baseline system, the modified system of the invention requires relatively little engineering development to adapt it to a particular aircraft.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

Figure 1:
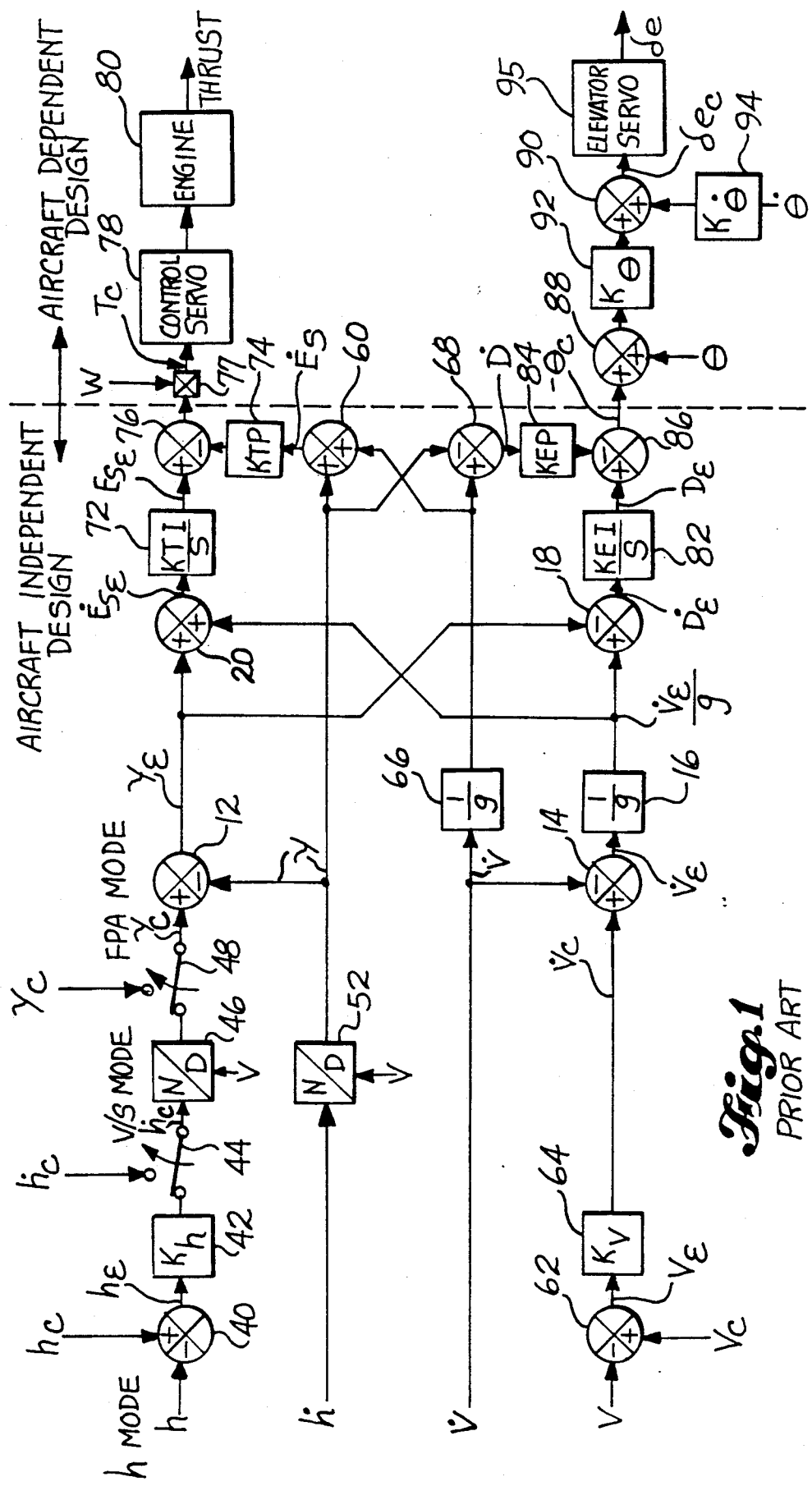
FIG. 1 is a simplified schematic diagram of the prior art baseline integrated total energy control system.
Figure 2:
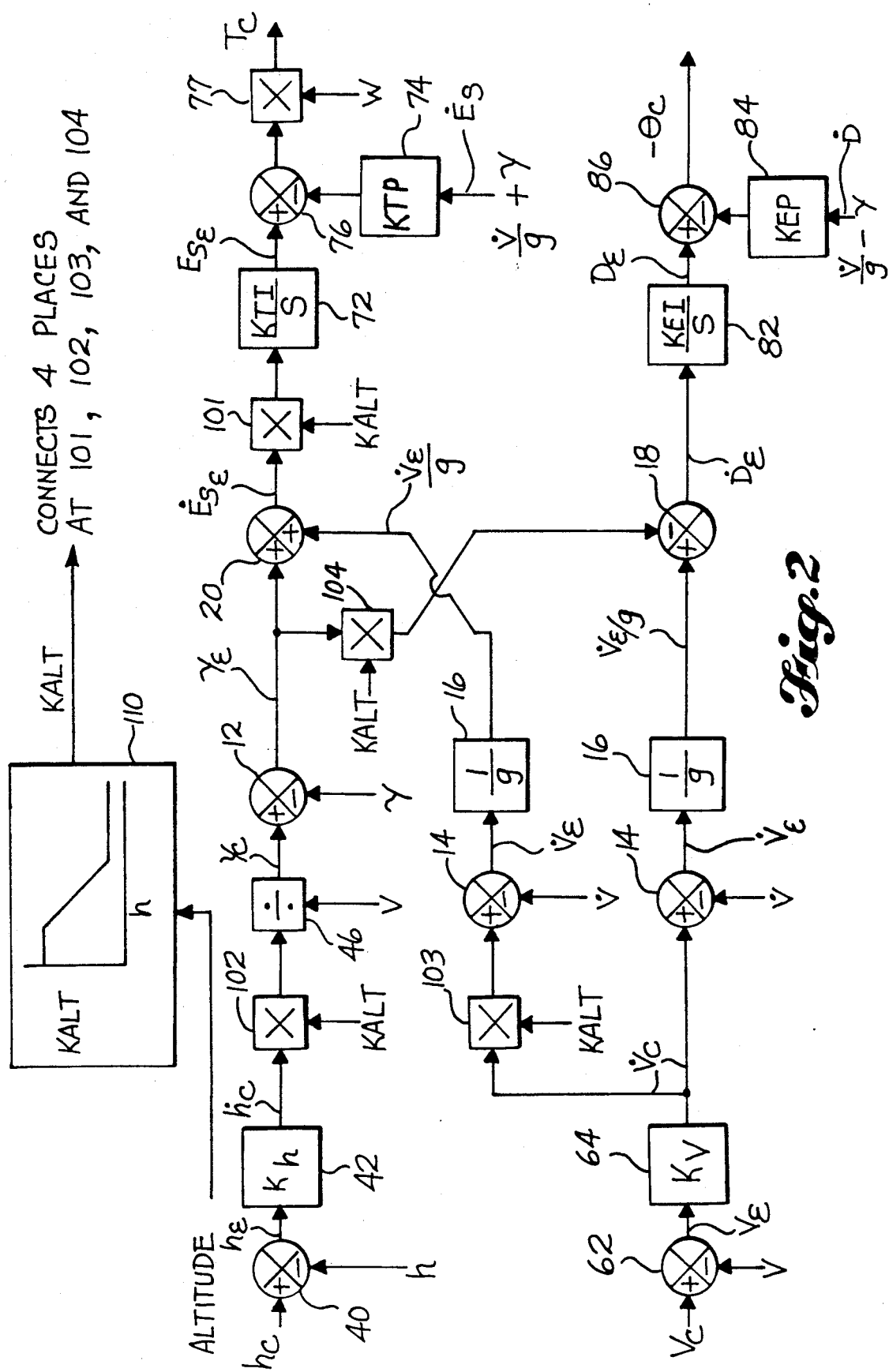
FIG. 2 is a simplified schematic diagram of the relevant parts of the system shown in FIG. 1 modified in accordance with the first preferred embodiment of the invention.
Figure 3:
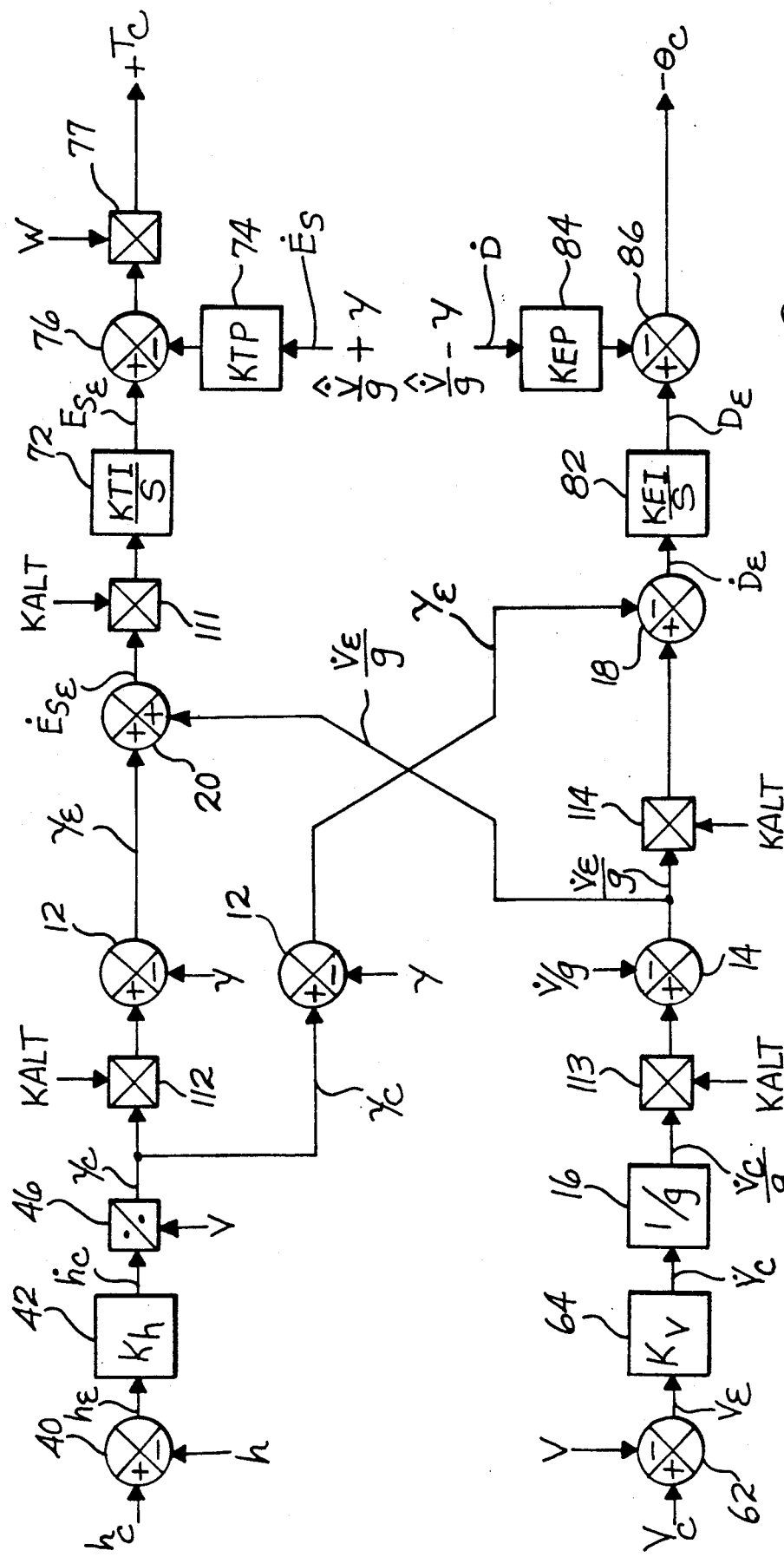
FIG. 3 is like FIG. 2 except that it shows an alternative preferred embodiment of the system of the invention.

FIGS. 2 and 3 illustrate two embodiments of a vertical flight path and speed control system that represent the best modes for carrying out the method and apparatus of the invention currently known to the applicants. The systems shown in FIGS. 2 and 3 are modifications of the previously patented basic control system illustrated in FIG. 1. Although it is anticipated that the primary application of the present invention will be in systems of the type illustrated in FIG. 1, it is intended to be understood that the invention may also be used to advantage in other types of overall control systems employing a total energy concept. FIGS. 4-10 illustrate the effect of the present invention in the type of system shown in FIG. 1.

An understanding of the total energy control concept is essential to an understanding of the present invention. Therefore, the system shown in FIG. 1 will be described briefly herein prior to addressing the modified systems of the present invention. A more detailed discussion of the basic energy control system is provided in the above-cited U.S. Pat. No. 4,536,843, which covers the basic system. The disclosure of that patent is incorporated herein by reference.

The overall design philosophy of the basic control system is to compute the aircraft's total energy error and the energy distribution error, and to control the total energy error with thrust, while using the elevator to control the energy distribution error. The total energy error is computed by subtracting the aircraft's actual total energy, computed from actual flight path and speed and associated input, from the desired total energy, computed from flight path, speed, and associated targets. The energy distribution error is the error in the distribution of energy between the flight path and speed. For all flight conditions, thrust is the most effective means to change the aircraft's energy state, whereas elevator control provides an effective means to modulate energy distribution and stabilize the aircraft's attitude.

The total energy E of an aircraft is given by:

$$E = Wh + \tfrac{1}{2}(WV^2/g);$$

where:
g = acceleration due to gravity,
h = altitude,
V = longitudinal velocity, and
W = aircraft weight.

From the above, assuming constant weight W, the rate of change of the aircraft's energy E is given by:

$$\dot{E} = W(\dot{h} + V\dot{V}/g)$$

or $$\dot{E}/V = W(\gamma + \dot{V}/g)$$

where the flight path angle $\gamma = \dot{h}/v$.

Thus, at a given speed, the rate of change of the aircraft's total energy E is dependent only upon the flight path angle $\gamma$ and longitudinal acceleration $\dot{V}$. From the longitudinal equation of motion $$(W/g)\dot{V} = T - D - W\sin\gamma$$

where:
T = total thrust,
D = drag.
Assuming $\gamma$ is small, it follows that:

$$W(\gamma + \dot{V}/g) = T - D.$$

Thus, the aircraft's rate of change of total energy is proportional to the difference between thrust and drag. The thrust required to produce the rate of change of total energy is T required $= (\gamma + \dot{V}/g)W + D = \dot{E}/V + D = \dot{E}_s W/V + D$ where $\dot{E}_s$ represents the total specific energy rate of the aircraft, i.e. the rate of change of the aircraft's total energy normalized to represent total energy rate per pound of aircraft.

For commercial aircraft, drag is affected short-term mainly by configuration changes. Thus, at a given speed and drag configuration, the required incremental thrust is directly proportional to aircraft weight and the sum of the incremental flight path angle and longitudinal acceleration. Conversely, at a specific thrust level, it is possible to trade flight path angle for acceleration and vice versa, using the elevator control only.

The system illustrated in FIG. 1 applies a universal flight path and speed control concept to simultaneously control flight path and speed. In the system, the engine throttles are driven until the total specific energy rate error $\dot{E}_{s\epsilon}$ relative to the target flight path and acceleration is zero. Given that it is desired to change from a present flight path angle $\gamma$ to a commanded flight path angle $\gamma_c$ and/or, it is desired to change the longitudinal acceleration $\dot{V}$ to a commanded value $\dot{V}_c$, $$\dot{E}_{s\epsilon} = \gamma_\epsilon + \dot{V}_\epsilon/g$$

where $$\dot{V}_\epsilon = \dot{V}_c - \dot{V}$$

$$\gamma_\epsilon = \gamma_c - \gamma$$

Simultaneously, the elevator is driven until the energy rate distribution error $$\dot{D}_\epsilon = -\gamma_\epsilon + \dot{V}_\epsilon/g$$

relative to the target flight path and acceleration is zero.

This basic control concept can be applied to any combination of specific speed and flight path control modes and at any flight conditions.

FIG. 1 is a simplified schematic diagram of the baseline total energy control system discussed above and disclosed in U.S. Pat. No. 4,536,843. FIG. 1 corresponds to FIG. 2 of the patent. In FIG. 1, each of the elements of the system is represented in block form. In the preferred embodiment, each element is a software element. However, the elements could also take the form of analog devices or a mixture of software and analog devices.

The right hand portion of FIG. 1 to the right of the broken line represents the portion of the system which is dependent on the design of the specific aircraft. This portion of the system relates directly to the control of engine thrust and elevator position. It includes a control servo 78 for the engine 80 and an elevator servo 95. It also includes circuit elements 77, 88, 90, 92, 94, described below.

The outer loop flight path input portion of the system is represented by the upper left hand portion of FIG. 1. Three control modes are illustrated. These include the altitude control mode (h MODE), the vertical speed control mode (V/S MODE), and the flight path angle control mode (FPA MODE). The flight path angle control mode is the most elementary. In this mode, a flight path angle command signal $\gamma_c$, representing the target flight path angle, is input directly into the control system. The signal $\gamma_c$ is produced using a mode control panel of a known type, such as the panel shown in FIG. 5 of the patent. Alternatively, the signal $\gamma_c$ may be provided by a flight management function. The FPA MODE is selected by moving a switch 48 to the upper position (as shown) indicated by the arrow in FIG. 1.

In the V/S MODE, the switch 48 is in the lower position shown in FIG. 1, and the switch 44 to the left of switch 48 (as shown) is moved into its upper position indicated by the arrow in FIG. 1. In this mode, a vertical speed command signal $\dot{h}_c$ is taken directly from the mode control panel and input into the control system. The signal $\dot{h}_c$ is fed to divider circuit 46 which divides it by a signal representative of the aircraft velocity V to produce a flight path angle command signal $\gamma_c$.

In the altitude control mode h MODE, both switches 44, 48 are in their lower positions, and an altitude command signal $h_c$ from the mode control panel and the actual altitude signal h from an altitude sensing means are fed into a summer 40 which subtracts h from $h_c$ to produce the altitude error signal $h_\epsilon$. The signal $h_{68}$ is fed to an amplifier 42 which multiplies the signal $h_\epsilon$ by a gain factor $K_h$ to produce a vertical speed command signal $\dot{h}_c$. This signal $\dot{h}_c$ is processed by the divider 46 to produce the flight path angle command signal $\gamma_c$.

As can be seen from the above, the source of the flight path angle command signal $\gamma_c$ depends on the control mode selected by the pilot. Whatever the source of the signal $\gamma_c$, it is fed into summer 12. The summer 12 also receives an actual flight path angle signal $\gamma$. The signal $\gamma$ is obtained from divider 52 which divides an actual vertical speed signal h by an actual longitudinal velocity signal V to produce the signal $\gamma$. The signal $\gamma$ is subtracted from the command signal $\gamma_c$ to produce a flight path angle error signal $\gamma_\epsilon$. This error signal $\gamma_\epsilon$ is then fed into the thrust control loop, i.e. the total energy control loop, represented by the upper right hand portion of FIG. 1 and into the elevator control loop, i.e. the energy distribution control loop, represented by the lower right hand portion of FIG. 1. Thus, both of these inner control loops are provided with a flight path error component.

The speed control outer loop is shown in the lower left hand portion of FIG. 1. It includes a summer 62 which subtracts an actual longitudinal velocity signal V from a command longitudinal velocity signal $V_c$ to produce a longitudinal velocity error signal $V_\epsilon$. The command signal $V_c$, like the flight path angle command signal $\gamma_c$, may be produced by a mode control panel or a flight management function. The error signal $V_\epsilon$ is multiplied in amplifier 64 by a gain factor $K_V$. This normalizes the error signal $V_\epsilon$ to produce a longitudinal acceleration command signal $\dot{V}_c$. Summer 14 subtracts an actual longitudinal acceleration signal $\dot{V}$ from the command signal $\dot{V}_c$ to produce the longitudinal acceleration error signal $\dot{V}_\epsilon$. The error signal $\dot{V}_\epsilon$ is divided by the acceleration of gravity constant g in circuit 16 to produce the normalized dimensionless error signal $\dot{V}_\epsilon/g$, which is fed into each of the inner control loops that control the engine thrust and elevator position, respectively. In the thrust control loop, the signal $\dot{V}_\epsilon/g$ becomes the speed component of the specific total energy rate error signal $\dot{E}_{s\epsilon}$. In the elevator control loop, it becomes the speed component of the energy rate distribution error signal $\dot{D}_\epsilon$.

Referring to the upper right hand portion of FIG. 1, a summer 20 in the inner thrust control loop receives the flight path angle error signal $\gamma_\epsilon$ and adds it to the speed error component signal $\dot{V}_\epsilon/g$ to produce a specific total energy rate error signal $\dot{E}_{s\epsilon}$. This error signal $\dot{E}_{s\epsilon}$ is fed to a circuit 72 which integrates the signal and multiplies it by a gain factor KTI to produce a specific total energy error signal proportional to the aircraft's specific total energy error $E_{s\epsilon}$. The specific total energy signal $E_{s\epsilon}$ is fed to a summer 76 which subtracts therefrom a thrust control damping signal received from amplifier 74. The output of summer 76 is multiplied by the weight W of the aircraft in circuit 77 to form the incremental net thrust command signal $T_c$. This command signal $T_c$ is received and processed by the thrust control servo 78 in a known manner to produce the incremental change in engine thrust required to reduce the total energy rate error $\dot{E}_\epsilon$ to zero, where $\dot{E}_\epsilon = W\dot{E}_{s\epsilon}$.

The input into amplifier 74 is a specific total energy rate signal $\dot{E}_s$, which the amplifier 74 multiplies by a gain factor KTP. The specific total energy rate signal is produced by a summer 60 which adds together the actual flight path angle signal $\gamma$ and an actual longitudinal acceleration component signal $\dot{V}/g$ produced by circuit 66. Circuit 66 divides the actual longitudinal acceleration signal $\dot{V}$ by the gravity constant g. The purpose of the thrust control damping signal from amplifier 74 is to make the engine throttle response smooth and overshoot-free. The engine 80 typically provides sufficient inherent control damping to accomplish this. Therefore, the need for the thrust control damping signal and the value of gain factor KTP depend on the type of engine 80. Typically, the engine 80 responds sufficiently quickly, and KTP may, therefore, be set to equal zero.

The inner elevator position control loop is shown in the lower right hand portion of FIG. 1. This inner loop includes a summer 18 which receives the same error signals $\gamma_\epsilon$ and $\dot{V}_\epsilon/g$ as the summer 20 in the thrust control loop. However, rather than adding these two signals like the summer 20, the summer 18 subtracts the flight path angle error signal $\gamma_\epsilon$ from the error signal $\dot{V}_\epsilon/g$ to produce an energy rate distribution error signal $\dot{D}_\epsilon$. The energy rate distribution error signal is fed to a circuit 82 which integrates the signal and multiplies it by a gain factor KEI. This produces an energy distribution error signal, proportional to the aircraft's energy distribution error $D_\epsilon$, that is fed to a summer 86. The summer 86 subtracts from the energy distribution error signal an energy distribution control damping signal provided by block 84. The output of summer 86 is an energy distribution control command signal which may be considered to be a pitch attitude command signal $-\theta_c$. This signal $-\theta_c$ is added to an actual pitch attitude feedback signal $\theta$ in summer 88. The output of summer 88 is multiplied by a gain factor $K_\theta$ in block 92. The output of block 92 is added, in summer 90, to the output of block 94, which multiplies an actual pitch rate signal $\dot{\theta}$ by a gain factor $K_{74}$. The output of summer 90 forms an incremental elevator position command signal $\delta_{ec}$ that is received by the elevator servo 95. The servo 95 processes the signal $\delta_{ec}$ to produce the change in elevator angle $\delta e$ necessary to incrementally reduce the energy rate distribution error $D_\epsilon$ to zero.

Block 84 receives an energy distribution rate signal D from summer 68 and multiplies it by a gain factor KEP. The summer 68 receives the same input as the summer 60 that is part of the inner thrust control loop but subtracts, rather than adds, the actual flight path angle signal $\gamma$. The purpose of the energy distribution control damping signal from block 84 is similar to the purpose of the thrust control damping signal from block 74. Its purpose is to make the elevator position response smooth and overshoot-free. Unlike the thrust control damping, the elevator control damping is substantially independent of the specific type of aircraft. Therefore, the gain factor KEP typically has a non-zero value that can be the same for many types of aircraft.

In the system shown in FIG. 1 and described above, each of the command signals $V_c$, $h_c$, $\dot{h}_c$, $\gamma_c$ may represent a change directed by the pilot on the mode control panel or by a flight management function. For example, in the speed control mode, the pilot may input a command $V_c$ representing a change in speed. The system responds by making the necessary changes in thrust and elevator position to attain the new speed without significantly affecting the flight path. The command signals may also be constant commands to maintain a predetermined altitude and speed during, for example, high altitude cruising. In this mode of operation, the system acts to correct deviations in speed and flight path caused by unsteady airmass conditions like turbulence and wind shear.

The preceding discussion of the total energy control system disclosed in U.S. Pat. No. 4,536,843 describes some of the more basic features and the basic functioning of the patented system. Additional, more detailed, features are described in the paten- Such features include functional details relating to system reconfiguration and operation when thrust limits are encountered. These limiting features and the other detailed features of the patented system may also be desirably incorporated into the modified system of the invention. They are not described herein because they do not directly affect the modifications which are the subject of the present invention.

In the system shown in FIG. 1, the control bandwidth is essentially constant over the entire flight regime. The basic approach of the invention is to vary the bandwidth of the total energy control loop in order to obtain reduced throttle activity.

According to the invention, a variable bandwidth factor KALT is provided, and the value of the factor KALT is predetermined for each of a plurality of flight conditions. The bandwidth factor KALT is applied, in the system shown in FIG. 1 modified in accordance with the invention, to the net thrust command signal $T_c$ to reduce throttle activity in certain predetermined flight conditions. The factor KALT is simultaneously applied to either the flight path component $\gamma_\epsilon$ or the speed component $\dot{V}_\epsilon/g$ of the energy rate distribution error signal $\dot{D}_\epsilon$. This applying of the KALT factor to one of the components of the energy rate distribution error prioritizes the elevator position command signal $\delta e_c$ to reduce the other component of the energy rate distribution error to zero. The prioritizing of the other component allows it to continue to be reduced to zero at the same rate as it is in the baseline system. The component to which KALT is applied reduces to zero at a slower rate. The system preferably also applies the bandwidth factor KALT to the speed error signal $V_\epsilon$ and the altitude error signal $h_\epsilon$ to preserve the stability of the system, as described further below.

In each of the preferred embodiments disclosed in FIGS. 2 and 3, the bandwidth factor KALT is a function of altitude h. FIG. 2 includes a circuit 110 that computes the value of KALT as a function of altitude h. The computed value of KALT is continuously fed into the rest of the system at blocks 101, 102, 103, 104 so that the correct factor for the current flight conditions, i.e. altitude, at any given time is applied in the control circuits. The value of KALT in the illustrated preferred embodiments typically is maintained at a high value of 0.5 to 1.0 at low altitudes and gradually decreases in value once an altitude is reached at which a relaxing of tight control is permissible. The value of KALT reaches a minimum at a predetermined high altitude, such as the cruising altitude. The minimum value of KALT is typically about 0.1 to 0.05.

When KALT equals 1, the modifications of the invention have no effect on the baseline tight, uncoupled control of the patented system. As KALT decreases in value, the baseline bandwidth of the total energy control loop decreases, and some coupling of flight path control and speed control occurs. To date, it appears that some airplanes and flying conditions will permit a value of KALT less than 1 even at low altitudes. However, for most airplanes it may be necessary to maintain the value of KALT at 1 at low altitudes. In addition, the system of the invention preferably includes a means for the pilot and/or a flight management function to override circuit 110 and hold the factor KALT at a value of 1 regardless of the altitude. This is desirable, for example, when special conditions require tighter control than is provided in the normal operation of the system.

In the basic total energy control system shown in FIG. 1, the feedback gains $K_h$, $K_v$ applied by blocks 42, 64 determine the time constant of the energy error decay ($\tau_v = 1/K_v$, $\tau_h = 1/K_h$). The gain factor KTI applied in block 72 may be considered a proportionality constant for reducing the total energy error $E_{s\epsilon}$ to zero. In principle, $KTI = 1/\tau_E$, where $\tau_E$ is the total energy error decay time constant. Similarly, the gain factor KEI applied in block 82 may be considered a proportionality constant for reducing the energy distribution error $D_\epsilon$ to zero. In principle, $KEI = 1/\tau_D$, where $\tau_D$ is the energy distribution error decay time constant. In the basic system, the decoupling of flight path control and speed control is accomplished by selecting the feedback gains $K_h$ and $K_v$ to be equal and the gain factors KTI [and KEI to be approximately equal. Some individual adjustments of the gains KTI, KEI may be needed to achieve the best match between the total energy control dynamics and the energy distribution control dynamics. Also, the pitch control loop dynamics are matched to the engine control loop dynamics.

The improvement of the invention is a gain programmer that selectively changes the system gains to reduce the bandwidth of the total energy control and prioritize either speed control or flight path control. The manner in which the KALT factor is applied in order to achieve the gain programming may be best understood with reference to the two embodiments shown in FIGS. 2 and 3. Referring to FIG. 2, the factor KALT is applied to the net thrust command signal at block 101 in order to reduce the bandwidth of the inner total energy control loop by increasing the total energy error decay time constant $\tau_E$. Since the KALT factor reduces the bandwidth by adjusting the gain factor KTI, the factor KALT is applied downstream of summer 20 and upstream of the integrator of block 72. This lowers the feedback gain on the specific total energy rate error signal $E_{se}$ to the thrust command computation. The lowering of the total energy control bandwidth by multiplying the error signal in block 101 achieves the desired result of reducing throttle activity.

Since the altitude and speed feedback loops are outer loops to the inner total energy control loop, the feedback gains $K_h$, $K_v$ must be reduced proportionally to gain factor KTI in order to maintain system stability. Therefore, the factor KALT is also applied at blocks 102, 103. Block 102 multiplies the gain factored output from block 42 by KALT. Since altitude feedback is input into the control system only in the altitude control mode (h MODE), block 102 is positioned upstream of switch 44 (not shown in FIG. 2 for clarity of illustration). In order to apply the KALT factor to the altitude error signal $h_\epsilon$, block 102 is positioned downstream of the summer 40. The application of the KALT factor in blocks 102, 103 assures frequency separation between the inner and outer energy control loops to thereby preserve system stability.

Since speed control is prioritized in the most preferred embodiment illustrated in FIG. 2, the feedback gain factor $K_v$ in the outer speed control loop should be modified only as it applies to the total energy control loop, and not as it applies to the energy distribution control loop. Therefore, the gain factored output from block 64 is fed into two separate branch circuits just downstream of block 64. The lower (as shown) branch circuit is the same as the corresponding circuit into the inner energy distribution control loop shown in FIG. 1. The other branch circuit includes block 103 which multiplies the gain factored longitudinal acceleration command signal $V_c$ from block 64 by the KALT factor upstream of summer 14. Since the cross-feed branch circuit to the inner total energy control loop occurs upstream of the point of the cross-feed in FIG. 1, blocks 14 and 16 are repeated in each of the branch circuits to obtain the required input signal $V_\epsilon/g$ into each of the summers 18, 20. When KALT is less than 1, the error signal into summer 20 is proportionally less then the signal into summer 18.

The result of the application of KALT at blocks 101, 102, 103 is to reduce the total energy control loop bandwidth while maintaining the nominal bandwidth of the energy distribution control loop. This, in turn, causes a decrease in engine throttle activity, which is desirable with increasing altitude because of the decrease in the effectiveness of throttle displacement with increasing altitude. The maintenance of the nominal bandwidth of the energy distribution control loop is permissible since the elevator control effectiveness is not adversely affected by increasing altitude. Separating block 103 from the airspeed error feedback path to the elevator control computations maintains the nominal bandwidth.

The additional application of the KALT factor in block 104 is necessary in order to obtain the desired prioritization of speed control in the energy distribution control loop. Without block 104, the energy errors produced by the lowering of the bandwidth of the total energy control loop would tend to be equally distributed between flight path deviations and speed deviations. Block 104 is positioned between summer 12 and summer 18 in the cross-feed circuit from the outer altitude feedback loop. The flight path angle error signal $\gamma_\epsilon$ is multiplied by KALT in block 104. This shifts the energy distribution control in favor of speed control. The flight path angle error signal $\gamma_\epsilon$ is reduced to a low value rather than eliminating it from the input into summer 18 in order to minimize speed errors due to slow flight path maneuvering. The net result of the application of KALT in all four blocks 101, 102, 103, 104 is to maintain normal speed control dynamics at all points in the flight envelope with decoupled or substantially decoupled altitude control and speed control at low altitude. At high altitudes, there is some coupling of flight path control and speed control, and energy errors caused by the reduction of the bandwidth of the total energy control loop are channeled into short term deviations in altitude.

The altitude deviations caused by the speed control are nulled out by the total energy control loop with lower frequency dynamics than the speed control provided by the elevator. Thus, at higher altitudes, in order to reduce demand for engine throttle activity, the speed control temporarily borrows energy from altitude to effect a speed change, and the total energy control loop makes up the total energy error at a much reduced rate.

These high altitude control configuration changes also result in reduced response rates to small altitude change commands because the flight path feedback gain into both the total energy control loop and the energy distribution control loop is reduced. The flight path error cross-feed into the elevator control loop serves mainly to establish the correct elevator trim during the altitude command maneuvers so that no speed deviation is induced by altitude control in any flight condition. For large altitude change commands, the throttles are always driven to the limit, resulting in constant speed/constant thrust climb or descent and smooth capture of the target altitude.

Although the embodiment shown in FIG. 2, in which speed control is prioritized, is preferred, the KALT factor may also be applied to prioritize flight path control without departing from the spirit and scope of the invention. The preferred configuration of the system in which flight path is prioritized is illustrated in FIG. 3. In this system, the value of the KALT factor is determined in the same manner as it is in the system shown in FIG. 2. The KALT factor is applied to the control system at blocks 111, 112, 113, 114.

Block 111 applies the KALT factor in the same manner as block 101 applies the KALT factor in the embodiment shown in FIG. 2 to reduce the bandwidth of the total energy control loop. The KALT factor is also applied in blocks 112, 113 in a manner similar to the application by blocks 102, 103 in FIG. 2. In both cases, blocks 102, 103, 112, 113 operate to maintain system stability as well as to reduce energy control bandwidth. Since flight path control is prioritized in this embodiment, the KALT factor is applied by 113 to the feedback gain $K_v$ upstream of the branching of the feedback from the outer speed control loop to the total energy control loop and the energy distribution control loop. As in the embodiment of FIG. 2, the gain programming block 113 is positioned upstream of the summer 14 and downstream of the summer 62.

Since the elevator control loop is prioritized to control flight path in the embodiment shown in FIG. 3, the cross-feed branch circuit from the outer altitude control loop to the inner elevator control loop is moved upstream relative to its position in FIGS. 1 and 2. This allows application of the KALT factor by block 112 to the altitude error feedback into the total energy control loop but not to the altitude error feedback into the energy distribution control loop. As in the embodiment shown in FIG. 2, this requires the duplicating of some circuit elements in the branch circuits, specifically summer 12. It also requires reconfiguration of the V/S MODE and FPA MODE circuits in a known manner (not shown) to maintain the status of block 112 as applying only in the h MODE of flight path control.

The fourth application of the KALT factor in block 114 prioritizes the elevator control loop for flight path control in the same manner that block 104 in FIG. 2 prioritizes speed control. Block 114 is positioned downstream of summer 14 and the branch into the total energy control loop and upstream of summer 18. The prioritizing of flight path control channels energy errors into short term deviations in speed while altitude is tightly controlled by the elevator.

The embodiment of FIG. 2 is preferred over the embodiment of FIG. 3 because of some significant limitations of the latter. Prioritizing flight path control may impose limitations on the value of KALT that would result in greater throttle activity than in the system of FIG. 2. The limiting of KALT would be required to maintain adequate system stability since the induced speed deviations may drive the system to operate on the back side of the speed-drag curve. The system of FIG. 3 would definitely need safeguards against stall and overspeed. Examples of these safeguards are described in U.S. Pat. No. 4,536,843.

In each of the two embodiments of the invention illustrated in FIGS. 2 and 3, the same KALT factor is applied in each of the four blocks 101, 102, 103, 104, 111, 112, 113, 114. It is generally preferred that the same KALT factor be applied in each of the four control system positions as shown in FIGS. 2 and 3. However, it is not necessarily required that all four factors be equal. Generally, the first KALT factor applied in block 101, 111 is chosen with the major consideration being lowering of the total energy control loop bandwidth. In order to preserve system stability, the second and third blocks 102, 103, 112 113 must apply a factor that is not significantly higher than the factor applied in block 101, 111. However, the second and third factors may be lower than the first factor without adversely affecting system stability. The fourth KALT factor applied in block 104, 114 is the most independent of the factors. However, it too is preferably at least substantially equal to the first factor. Variation of the fourth factor from equality with the first factor will increase speed deviations when there is a command altitude change. Variations above and below the first factor value will result in speed errors in opposite directions. The equal relationship between the factors applied in blocks 101, 111 and 104, 114 maintains a balance in the maintenance of the speed.

Figure 4:
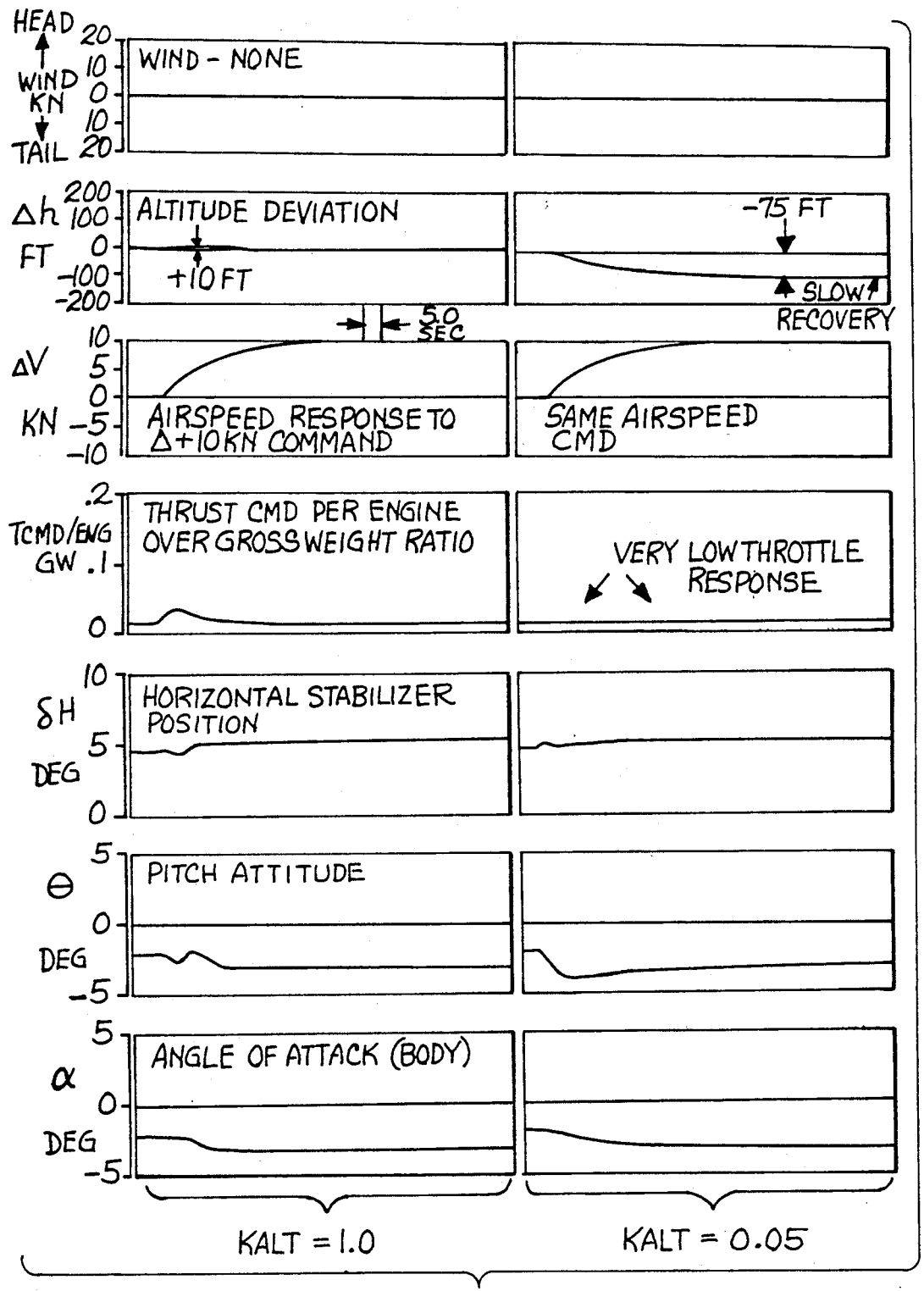
FIG. 4 is a series of graphs showing a side-by-side comparison of the performance of the baseline system and the preferred embodiment of the invention illustrated in FIG. 2 at a high altitude in dead calm air when a command to change air speed is made.
Figure 7:
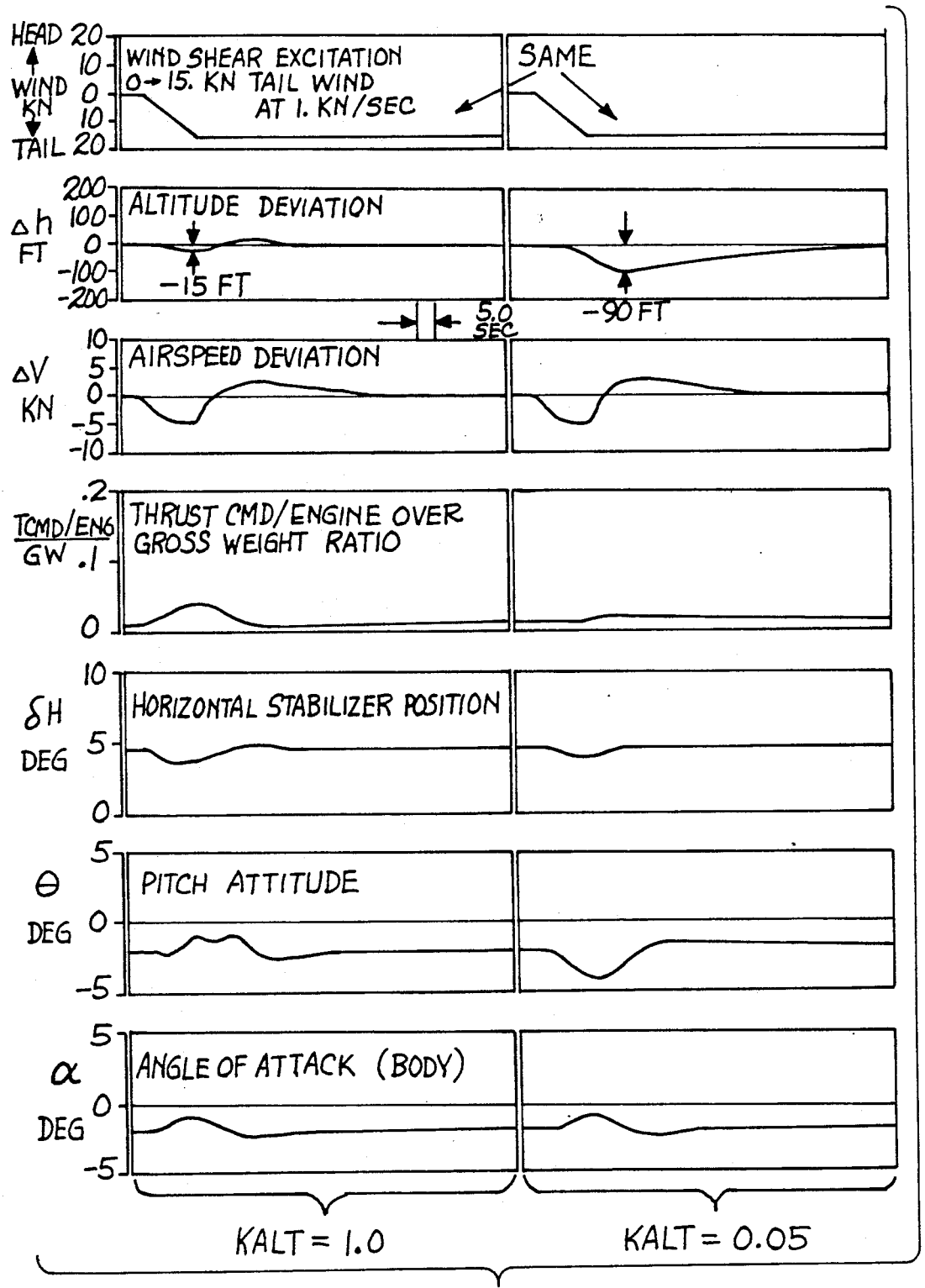
FIG. 7 is like FIG. 6 except that it illustrates wind shear conditions.
Figure 8:
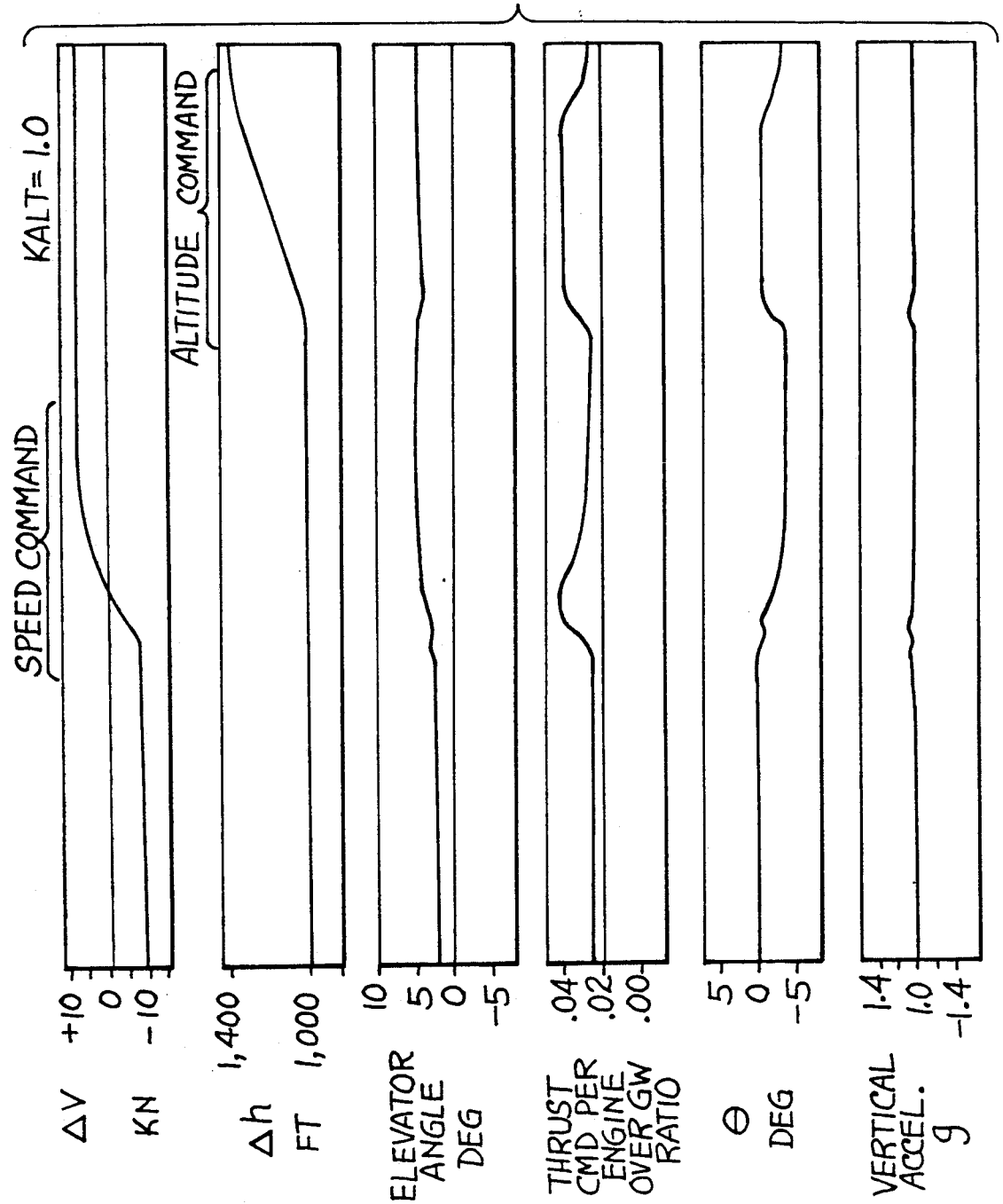
FIG. 8 is a series of graphs further illustrating the performance of the baseline system in calm air.
Figure 9:
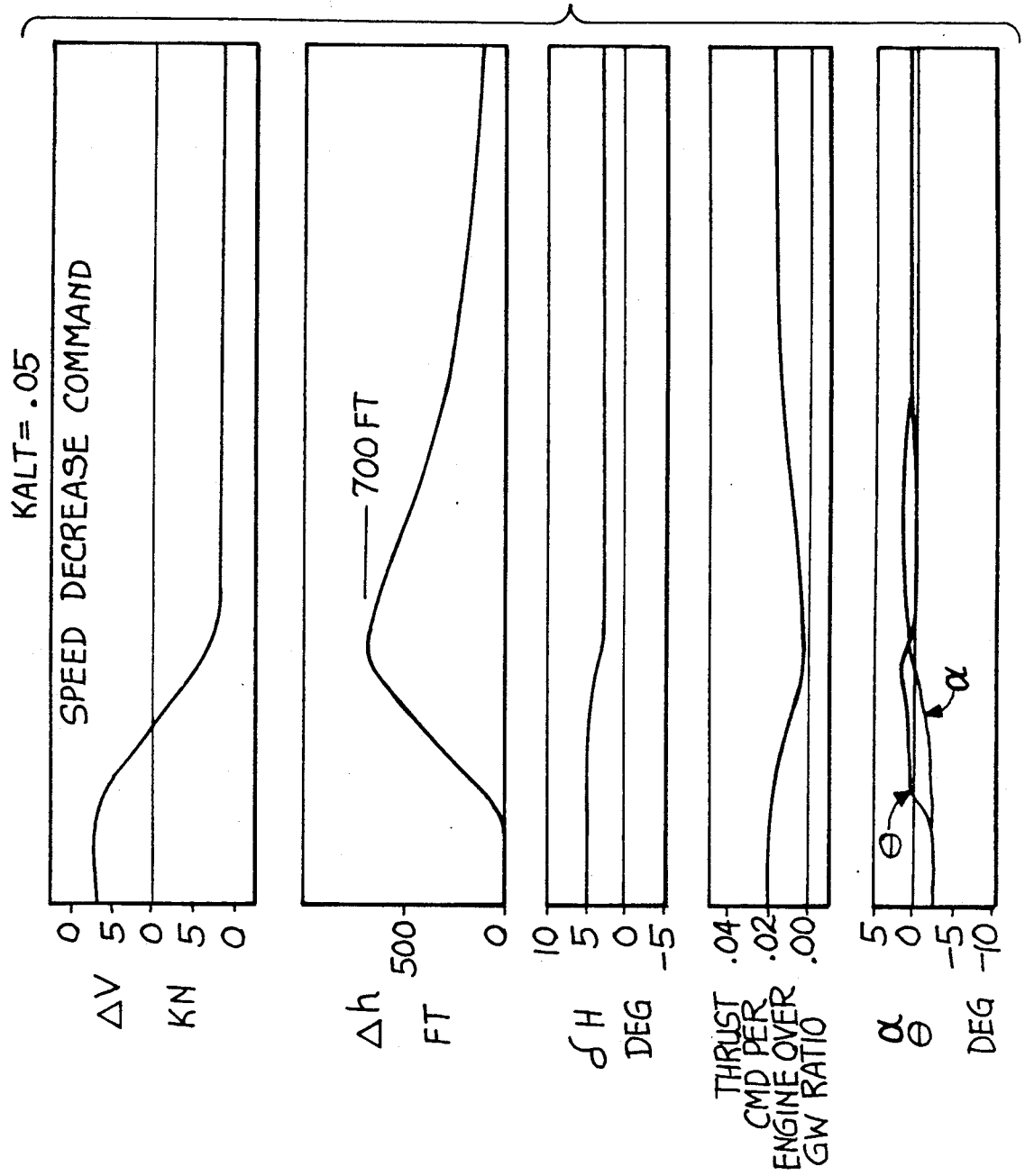
FIG. 9 is a series of graphs further illustrating the performance of the preferred embodiment of the invention at high altitude in response to an airspeed change command.

FIGS. 4-10 illustrate the functioning of the basic system shown in FIG. 1 and the preferred embodiment of the system of the invention shown in FIG. 2. FIG. 4 is a side-by-side comparison of the functioning of the two systems at a high altitude in dead calm air when an airspeed change command of plus ten knots is given. The left portion of FIG. 4 shows the response over time of the system shown in FIG. 1 (or the system shown in FIG. 2 with KALT maintained at a value of 1.0). The right portion of FIG. 4 shows the response of the system shown in FIG. 2 when KALT has a value of 0.05. The airspeed response is virtually identical in both cases. However, the throttle response is significantly reduced by the setting of the value of KALT to 0.05. The total energy error created by the speed step change command and the reduced throttle response is channeled into an altitude deviation indicated by the graph second from the top on the right-hand portion of FIG. 4. This altitude deviation subsequently subsides very slowly, as the total energy control loop nulls out the total energy error. The subsiding of the altitude error is not shown fully in FIG. 4, but is illustrated in FIG. 9. As shown in FIG. 9, a relatively large speed reduction command causes excess energy to be transferred temporarily to altitude. The throttle responds slowly to correct the altitude error.

It should be noted that FIG. 9 illustrates a large (i.e. V max to V min) speed command change at high altitude and corresponds to simulated flight of a high altitude, long endurance aircraft. It should also be noted that, for a given value of KALT less than one, the short term altitude deviation per knot of speed change increases with altitude. Thus, a commercial aircraft employing the system of the invention generally would not experience the relatively large altitude deviation represented in FIG. 9 because commercial aircraft are flown at lower cruise altitudes than the type of aircraft from which the data represented in FIG. 9 was derived. The left-hand portion of FIG. 8 further illustrates the response of the system to a speed change command when the KALT factor equals 1.0. FIG. 8 illustrates the performance of the same aircraft whose performance is shown in FIG. 9.

Figure 5:
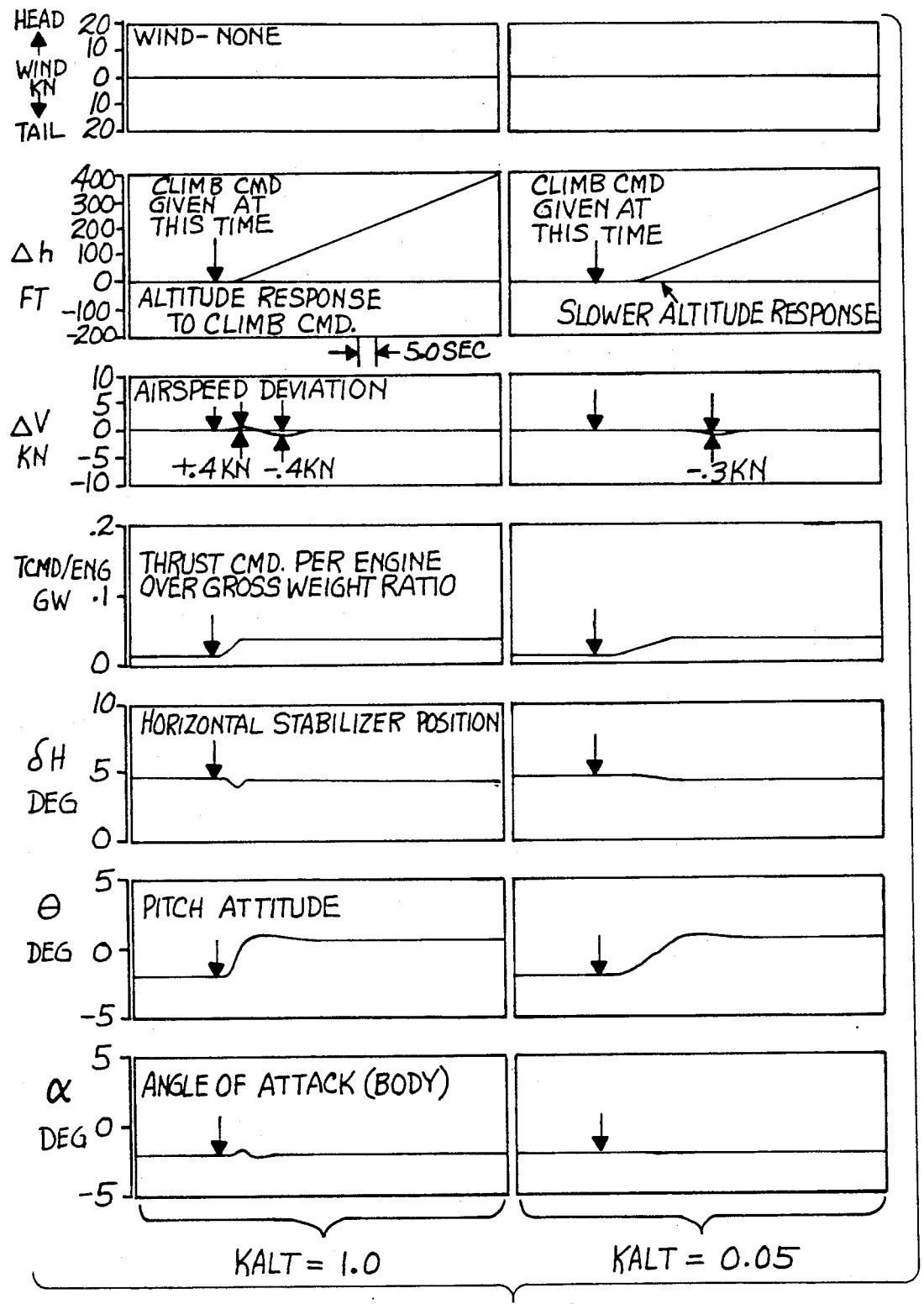
FIG. 5 is like FIG. 4 except that it shows the relative performances when a climb command is given.
Figure 10:
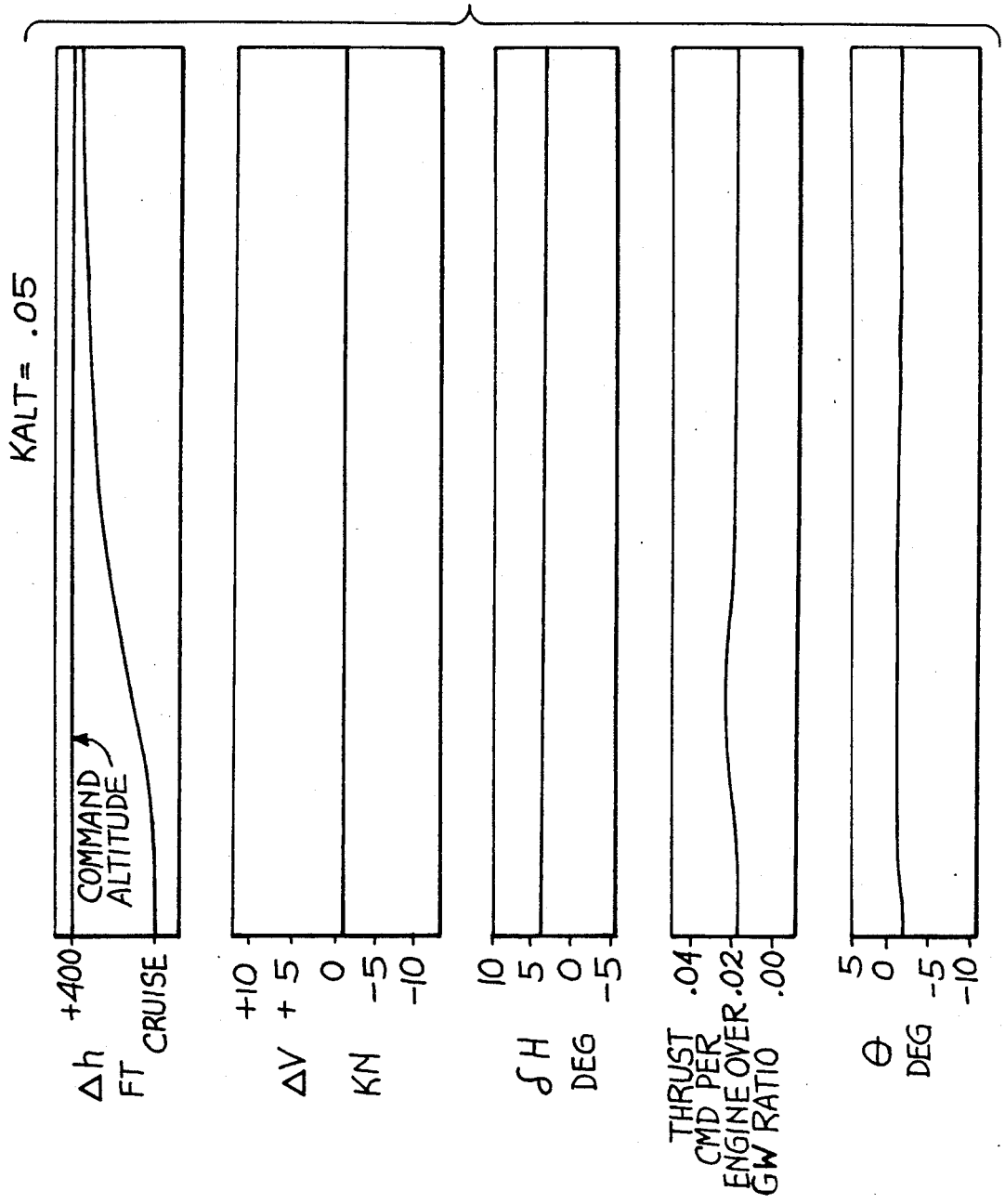
FIG. 10 is like FIG. 9 except that it illustrates the response to a change in altitude command.

FIG. 5 is a side-by-side comparison similar to FIG. 4 but shows the relative responses to a large altitude change command. With KALT equal to 1.0, a relatively large step change in the altitude command quickly drives the thrust command to the limit and rotates the aircraft into a maximum thrust climb condition without incurring a significant speed deviation. With KALT equal to 0.05, the same command change causes the thrust to drive to the limit and to rotate the aircraft to the maximum thrust climb condition considerably slower. However, once the thrust has reached its limit, the climb out will be the same as it is when KALT equals 1.0. The speed deviation incurred in the slower maneuver represented in the right-hand portion of FIG. 5 is negligible. A somewhat larger speed deviation is experienced in the baseline system, as shown in the left-hand portion of FIG. 5. The comparison illustrated in FIG. 5 is further illustrated in the right-hand portion of FIG. 8 and in FIG. 10. The right-hand portion of FIG. 8 further illustrates the response of the baseline system. FIG. 10 further illustrates the response of the system of the invention for a relatively small altitude command adjustment when KALT equals 0.05. The commanded new altitude is captured smoothly and overshoot free, but the capture takes more time than it would with KALT equal to 1.0.

Figure 6:
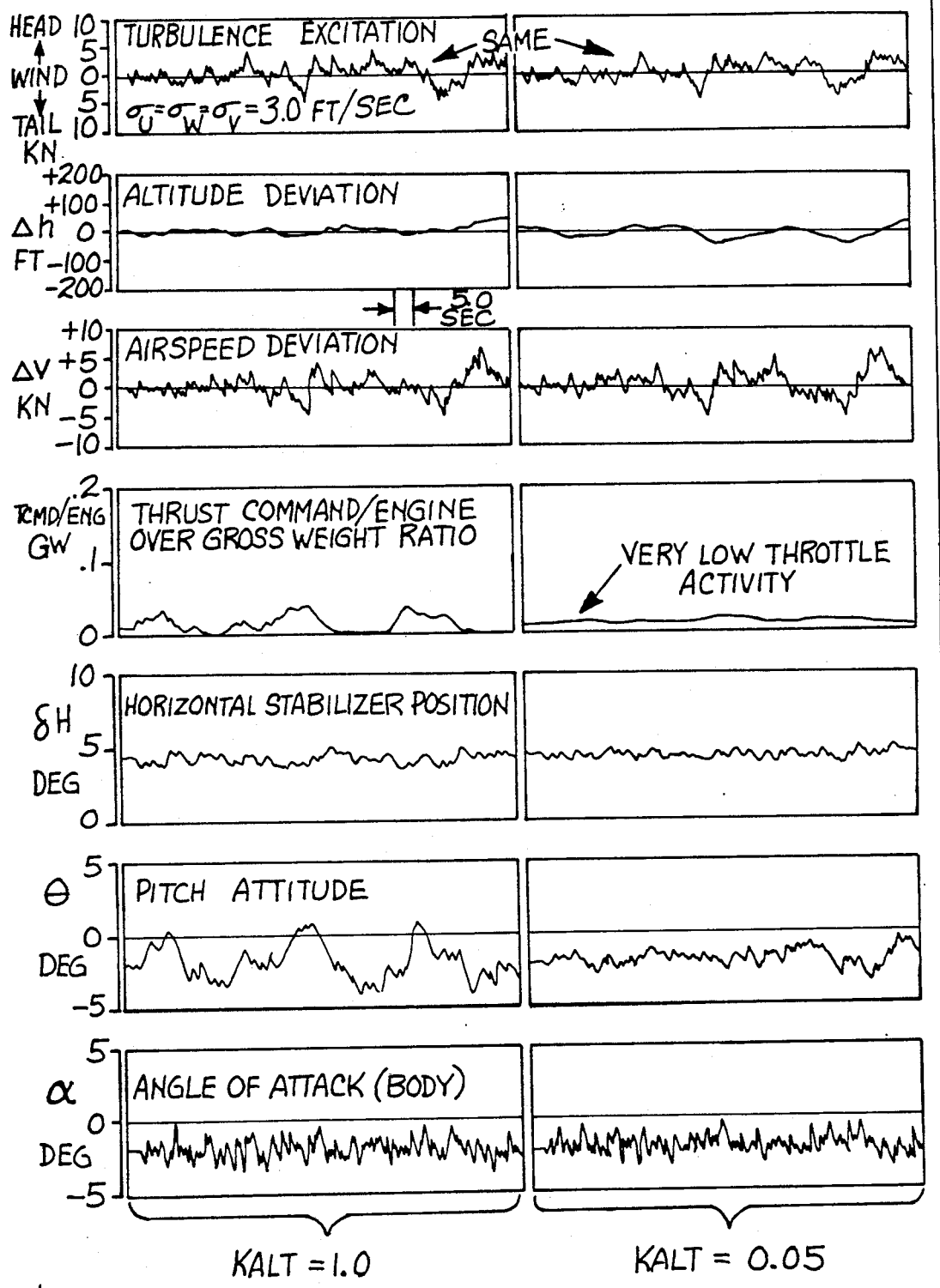
FIG. 6 is a series of graphs providing a side-by-side comparison of the performance of the baseline system and the preferred embodiment of the invention under high altitude turbulence conditions.

FIG. 6 shows a side-by-side comparison of the two systems with constant command altitude and speed in high altitude turbulent conditions. The reduction of KALT from 1.0 to 0.05 dramatically reduces the thrust activity while having virtually no effect on the speed error response and only a minor effect on the altitude error response. FIG. 6 also illustrates the reduction in pitch activity produced by lowering KALT to 0.05. This reduction in pitch activity has a beneficial effect on passenger comfort.

FIG. 7 is similar to FIG. 6 but shows the relative performances in wind shear conditions. With a KALT value of 0.05, speed control is virtually the same as with a KALT value of 1.0. The total energy loss due to the wind shear is almost entirely reflected in altitude, until the slower total energy control loop represented by the right-hand portion of FIG. 7 can make up the deficiency. The deviation in altitude, however, is maintained at a safe level for high altitude cruise conditions.

The data represented in FIGS. 4-10 corresponds to simulated flights of an airplane with an all flying horizontal tail, rather than a conventional elevator control surface. Operation of either type of control surface is consistent with the present invention. Therefore, it is intended to be understood that references to elevator position, elevator angle, and the like herein include all flying horizontal tail control surfaces and other types of equivalent pitch control surfaces as well as conventional elevator control surfaces.

The control system of the invention is highly versatile and may be applied advantageously to a wide range of aircraft types. Since most of the control system is aircraft independent, the system may be applied on any conventional aircraft without significant additional development work. Whatever the aircraft type, the desired lower throttle activity with decreasing KALT factor is attained while maintaining excellent system stability over the entire flight envelope.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A method of controlling vertical flight path and speed of an aircraft and of reducing engine throttle activity, comprising:
    predetermining the value of a variable bandwidth factor for each of a plurality of flight conditions;
    providing a total energy control loop and an energy distribution control loop;
    during flight, determining a total energy rate error and an energy rate distribution error, each said error having a flight path component and a speed component;
    generating, in said total energy control loop, an incremental net thrust command signal as a function of said total energy rate error to reduce said total energy rate error to zero, and generating, in said energy distribution control loop, an incremental elevator position command signal as a function of said energy rate distribution error to reduce said energy rate distribution error to zero; and
    applying said bandwidth factor to said net thrust command signal to lower the bandwidth of said total energy control loop and thereby reduce throttle activity in certain predetermined flight conditions, and simultaneously applying said bandwidth factor to one of said components of said energy rate distribution error to prioritize said energy distribution control loop to reduce the other of said components of said energy rate distribution error to zero.

2. The method of claim 1, in which said bandwidth factor is a function of altitude.

3. The method of claim 1, comprising applying said bandwidth factor to said flight path component of said energy rate distribution error to maintain speed control and channel energy errors into short term deviations in altitude.

4. The method of claim 2, comprising applying said bandwidth factor to said flight path component of said energy rate distribution error to maintain speed control and channel energy errors into short term deviations in altitude.

5. The method of claim 1, in which the step of determining said total energy rate error and said energy rate distribution error comprises receiving a command speed signal and an actual speed signal, subtracting said actual speed signal from said command speed signal to obtain a speed error signal, using said speed error signal to determine said speed component of said total energy rate error, and using said speed error signal to determine said speed component of said energy rate distribution error; and the step of using said speed error signal to determine said speed component of said total energy rate error includes applying said bandwidth factor to said speed error signal to preserve system stability.

6. The method of claim 5, comprising applying said bandwidth factor to said flight path component of said energy rate distribution error to maintain speed control and channel energy errors into short term deviations in altitude.

7. The method of claim 5, which comprises applying said bandwidth factor to said speed component of said energy rate distribution error to maintain altitude control and channel energy errors into short term deviations in speed, and in which the step of using said speed error signal to determine said speed component of said energy rate distribution error includes applying said bandwidth factor to said speed error signal to preserve system stability.

8. The method of claim 1, which comprises providing a selection of control modes for determining said flight path components of said errors; said modes including an altitude control mode in which an actual altitude signal is subtracted from a command altitude signal to obtain an altitude error signal, and the bandwidth factor is applied to said altitude error signal to preserve system stability.

9. The method of claim 3, which comprises providing a selection of control modes for determining said flight path components of said errors; said modes including an altitude control mode in which an actual altitude signal is subtracted from a command altitude signal to obtain an altitude error signal, and the bandwidth factor is applied to said altitude error signal to preserve system stability.

10. A system for controlling vertical flight path and speed in an aircraft and for reducing engine throttle activity, comprising:

means for determining a total energy rate error and an energy rate distribution error, each said error having a flight path component and a speed component;

a total energy control loop including means responsive to said total energy rate error for generating an incremental net thrust command signal to reduce said total energy rate error to zero;

an energy distribution control loop including means responsive to said energy rate distribution error for generating an incremental elevator position command signal to reduce said energy rate distribution error to zero; and means for applying a bandwidth factor, which varies in a predetermined manner with changes in flight conditions, to said net thrust command signal to lower the bandwidth of said total energy control loop and thereby reduce throttle activity in certain predetermined flight conditions, and for simultaneously applying said bandwidth factor to one of said components of said energy rate distribution error to prioritize said energy distribution control loop to reduce the other of said components of said energy rate distribution error to zero.

11. The system of claim 10, in which the means for applying said bandwidth factor applies said factor to said flight path component of said energy rate distribution error to maintain speed control and channel energy errors into short term deviations in altitude.

12. The system of claim 10, in which the means for determining said errors comprises means for receiving a command speed signal and an actual speed signal and for subtracting said actual speed signal from said command speed signal to obtain a speed error signal, and the means for applying the bandwidth factor comprises means for applying said factor to said speed error signal to preserve system stability.

13. The system of claim 11, in which the means for determining said errors comprises means for receiving a command speed signal and an actual speed signal and for subtracting said actual speed signal from said command speed signal to obtain a speed error signal, and the means for applying the bandwidth factor comprises means for applying said factor to said speed error signal to preserve system stability.

14. The system of claim 10, in which the system has an altitude control mode; and Which comprises means for receiving a command altitude signal and an actual altitude signal when the system is in said mode, means for subtracting said actual altitude signal from said command altitude signal to obtain an altitude error signal, and means for applying said bandwidth factor to said altitude error signal to preserve system stability.

15. The system of claim 12, in which the system has an altitude control mode; and which comprises means for receiving a command altitude signal and an actual altitude signal when the system is in said mode, means for subtracting said actual altitude signal from said command altitude signal to obtain an altitude error signal, and means for applying said bandwidth factor to said altitude error signal to preserve system stability.

16. The system of claim 15, in which the means for applying said bandwidth factor applies said factor to said flight path component of said energy rate distribution error to maintain speed control and channel energy errors into short term deviations in altitude.

* * * * *

UNITED STATES PATENT AND TRADEMARK OFFICE
CERTIFICATE OF CORRECTION

PATENT NO. : 5,079,711      Page 1 of 2
DATED : January 7, 1992
INVENTOR(S) : Antonius A. Lambregts and Monte R. Evans It is certified that error appears in the above-identified patent and that said Letters Patent is hereby corrected as shown below:

Col. 6, line 12, "energy E" should be -- energy $\dot{E}$ --.

Col. 6, line 13, "acceleration V" should be -- acceleration $\dot{V}$ --.

Col. 6, line 15, "(W/g) V" should be -- (W/g) $\dot{V}$ --.

Col. 6, line 27, "rat®of" should be -- rate of --.

Col. 6, line 29, "where $E_s$" should be -- where $\dot{E}_s$ --.

Col. 6, line 33, delete the exclamation point.

Col. 6, line 45, "error $E_{s_\varepsilon}$" should be -- error $\dot{E}_{s_\varepsilon}$ --.

Col. 6, line 49, "V to a commanded value $V_c$" should be -- $\dot{V}$ to a commanded value $\dot{V}_c$ --.

Col. 7, line 45, "signal $h_{68}$" should be -- signal $\dot{h}_\varepsilon$ --.

Col. 7, line 48, "signal $h_c$" should be -- signal $\dot{h}_c$ --, both occurrences.

Col. 7, line 56, "signal h" should be -- signal $\dot{h}$ --.

Col. 8, line 10, "signal V" should be -- signal $\dot{V}$ --.

Col. 8, line 26, "$E_{s_\varepsilon}$" should be -- $\dot{E}_{s_\varepsilon}$ --.

Col. 9, line 12, "$\theta$ by a gain factor $K_{74}$" should be -- $\dot{\theta}$ by a gain factor $K_{\dot{\theta}}$ --.

Col. 9, line 17, "$D_\varepsilon$ to" should be -- $\dot{D}_\varepsilon$ to --.

Col. 9, line 18, "signal D" should be -- signal $\dot{D}$ --.

Col. 9, line 33, "$V_c$, $h_c$, $h_c$, $\gamma_c$" should be -- $V_c$, $h_c$, $\dot{h}_c$, $\gamma_c$ --.

UNITED STATES PATENT AND TRADEMARK OFFICE
CERTIFICATE OF CORRECTION

PATENT NO. : 5,079,711
DATED : January 7, 1992
INVENTOR(S) : Antonius A. Lambregts and Monte R. Evans It is certified that error appears in the above-identified patent and that said Letters Patent is hereby corrected as shown below:

Col. 9, line 51, "paten-" should be -- patent. --.
Col. 10, line 26, "altitude,.at" should be -- altitude, at --.
Col. 10, line 57, "KTI = $1/\tau E_E$" should be -- KTI = $1/\tau_E$ --.
Col. 10, lines 65 and 66, "KTI-[and KEI" should be -- KTI and KEI --.
Col. 11, line 20, "$E_{s_\varepsilon}$" should be -- $\dot{E}_{s_\varepsilon}$ --.
Col. 11, line 57, "$V_\varepsilon/g$" should be -- $\dot{V}_\varepsilon/g$ --.
Claim 14, col. 18, line 13, "and Which" should be -- and which --.

Signed and Sealed this

Twenty-ninth Day of June, 1993

Attest:

MICHAEL K. KIRK

*Attesting Officer*    Acting Commissioner of Patents and Trademarks